Dec. 19, 1950     H. A. SILTAMAKI     2,534,801
ELECTRIC MOTOR CONTROL SYSTEM
Filed March 11, 1946
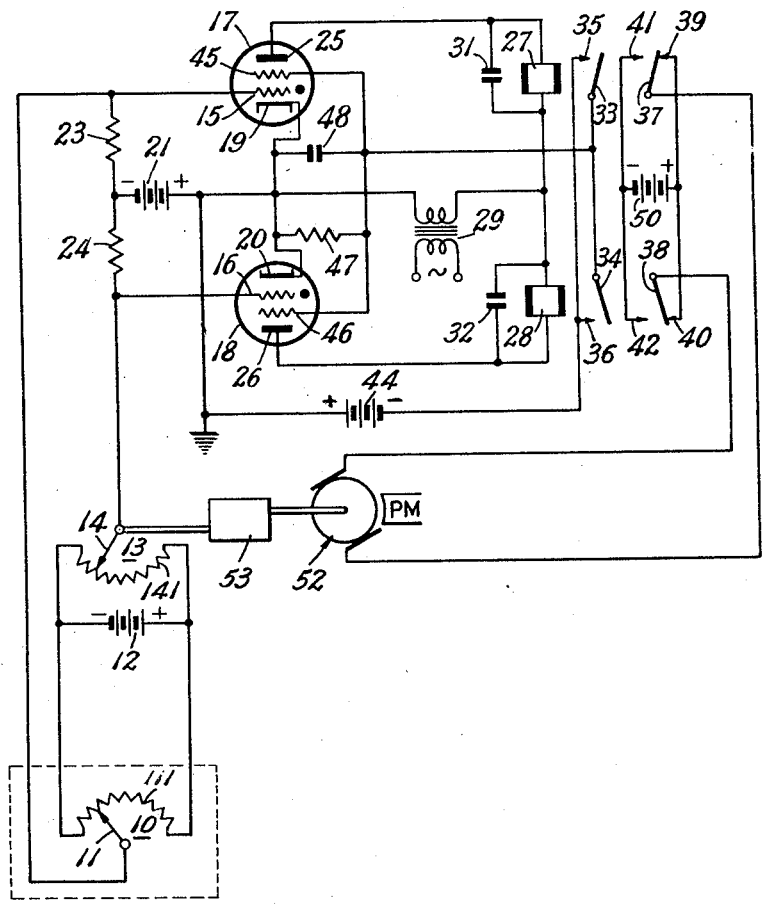
INVENTOR.
HAROLD A. SILTAMAKI
BY *EWoodbury*
ATTORNEY Patented Dec. 19, 1950

2,534,801

UNITED STATES PATENT OFFICE 2,534,801

ELECTRIC MOTOR CONTROL SYSTEM

Harold A. Siltamaki, Burbank, Calif., assignor to Bendix Aviation Corporation, South Bend, Ind., a corporation of Delaware Application March 11, 1946, Serial No. 653,509

1 Claim. (Cl. 318—29)

This invention relates to control systems for controlling electric motors and the like, and is particularly useful in remote control systems of the type in which a controlled motor-driven device is to be moved into a desired position in response to received signals.

An object of the invention is to provide an electrically controlled positioning device in which hunting is eliminated.

Another object is to progressively reduce the speed of a position-selecting device as it approaches a selected position, and thereby provide rapid response without danger of over-shooting.

Another object is to provide a simple and practicable system for energizing a motor from a low impedance source in response to signals from a high impedance source, in such a manner as to drive the motor at progressively lower speeds as it approaches a selected position.

Other more specific objects and features of the invention will appear from the description to follow of a specific embodiment thereof as illustrated in the drawing.

In accordance with the present invention, there is provided an improved control system having a follow-up action which progressively reduces the speed of a controlled motor as it approaches the selected position, by applying the control signals to one grid of a thyratron, and actuating a relay in response to current flow through the thyratron. The relay has contacts in the motor circuit for energizing it, and also has contacts which apply a negative bias to a second grid in the thyratron. The negative potential applied to the second grid is of such magnitude that it stops the flow of current through the thyratron unless the control potential applied to the first grid has a positive value exceeding a predetermined magnitude. The result is that when a positive control potential is applied to the first grid of the thyratron, the latter becomes conductive and energizes the relay to start the motor and apply the negative bias to the second grid. If the control potential applied to the first grid is relatively large, it maintains the thyratron in conductive condition despite the application of the negative voltage to the second grid, thereby holding the relay energized, to keep the motor running. However, as the motor approaches its desired position, the control potential becomes smaller and smaller and eventually reaches a value too small to maintain the thyratron conductive during the existence of the negative bias on the second grid. When this point is reached, the thyratron ceases to conduct, and the relay is deenergized to stop the motor and disconnect the biasing potential from the second grid. However, the removal of the negative bias from the second grid enables the relatively small positive potential on the first grid to again render the thyratron conductive and energize the relay. The overall result is that the motor runs continuously until it approaches its desired position, whereupon it runs intermittently or "pecks" into its final position. Since by this "pecking" action the motor feels its way into the final position, there is no possibility of over-shooting or hunting.

The single figure of the drawing is a schematic diagram of a remote control circuit incorporating the invention.

Referring to the drawing, there is shown a primary control means 10, which in this instance consists of a conventional potentiometer having a contact 11, movable on a resistor 111, opposite ends of which are connected to a current source 12. A secondary control means 13 may consist of a similar potentiometer having a movable contact 14 which is movable along another resistor 141 connected in shunt to the source 12. Obviously, when the contacts 11 and 14 occupy corresponding positions, they are at the same potential, whereas departure of either contact from position corresponding to that of the other contact results in a potential between the contacts, the polarity and the magnitude of which depends upon the direction and extent of departure from corresponding positions. The contacts 11 and 14 are shown connected directly to the first grids 15 and 16 respectively, of a pair of gas-filled tetrodes 17 and 18, connected in push pull and having cathodes 19 and 20 which are connected together. The cathodes 19 and 20 are connected through a source of negative biasing potential 21 and a pair of grid resistors 23 and 24 to the grids 15 and 16 respectively.

The anode 25 of the tube 17 is connected through a relay 27 and through a source of alternating current 29 to the cathodes 19 and 20. The anode 26 of the tube 18 is connected through a relay 28 to the A. C. source 29. The relays 27 and 28 may be shunted by condensers 31 and 32 respectively to facilitate their operation by the intermittent current resulting from rectification of alternating current from the source 29 in the tubes 17 and 18 when they are conductive.

The relay 27 has an armature 33 cooperating with a front contact 35, and an armature 37 cooperating with a back contact 39 and a front contact 41. The relay 28 has similar contacts and armatures 36, 34, 42, 38, and 40.

The contacts 35 and 36 are connected to the negative terminal of a source of biasing potential 44, the positive terminal of which is connected to cathodes 19 and 20. The armatures 33 and 34 are connected directly to second grids 45 and 46 respectively of the tubes 17 and 18, so that, when either of the relays 27 and 28 is energized, a negative potential is applied to those grids. A grid resistor 47 connects the grids 45 and 46 to the cathodes 19 and 20 for normally maintaining the second grids at cathode potential, and a grid condenser 48 is connected in shunt to the grid resistor 47 to introduce a delay in the restoration of the grids 45 and 46 to cathode potential following deenergization of the relay 27 or 28.

It will be observed that the back contacts 39 and 40 of the relays 27 and 28 are connected to one terminal of a D. C. source 50, and that the front contacts 41 and 42 are connected to the other terminal of this source. Furthermore, the armature 37 is connected to one terminal and the armature 38 is connected to the other terminal of a motor 52 which is shown as being of the permanent magnet-type which runs in one direction in response to current of one polarity, and in the opposite direction in response to current of opposite polarity. This motor 52 is shown connected to a load device 53 which can be adapted to perform any desired function. The motor 52 is also connected through the device 53 to the movable contact 14 and causes it to assume a position corresponding to the position of the load device 53, which constitutes the controlled means. It will be observed that when both the relays 27 and 28 are deenergized, both terminals of the motor 52 are connected to the same terminal of the source 50, so that the motor is not actuated. However, energization of the relay 27 moves the armature 37 away from contact 39 and against contact 41, which will cause the motor 52 to run in one direction. On the other hand, energization of the relay 28 moves the armature 38 away from contact 40 and against contact 42, causing the motor to run in the other direction.

The system described operates as follows: Let it be assumed that the movable contact 11 is moved from the position shown into a new position near the extreme right end of its associated resistor, thereby applying a relatively large positive potential to the control grid 15 of tube 17, and applying a negative potential of corresponding magnitude to the grid 16 of tube 18. It may be assumed that the source of biasing potential 21 is of just sufficient value to render the tubes 17 and 18 non-conductive when no potential difference is applied between the grids 15 and 16 from the control devices 10 and 13. Therefore, the positive potential applied to the grid 15 renders the tube 17 conductive, whereas the increased negative potential applied to the grid 16 leaves the tube 18 still in non-conductive condition.

The flow of anode current in tube 17 produced by the positive charge on grid 15 energizes the relay 27. This moves the armature 37 away from contact 39 and against contact 41, thereby connecting the source 50 to the motor 52 with such polarity as to run the motor in direction to shift the movable contact 14 to the right toward a position corresponding to that into which the movable contact 11 was shifted.

Energization of the relay 27 also closes the armature 33 on the contact 35, thereby connecting the source of negative biasing potential 44 to the grids 45 and 46. The application of the negative potential to the grid 46 has no effect, since tube 18 was already non-conductive. The application of the negative potential to the grid 45 may or may not render tube 17 non-conductive, depending upon the potential applied to the grid 15.

It has been assumed in the presence instance that the movable contact 11 was shifted to the right a substantial distance to thereby apply a relatively strong positive potential to the grid 15. Under this condition, the application of the negative potential of the source 44 to the grid 45 will not overcome the effect of the strong positive potential on grid 15, and the tube will remain conductive, causing the motor 52 to run without interruption until the movable contact 14 approaches to within a predetermined distance of the position corresponding to that into which the contact 11 was moved. However, as the contact 14 approaches the position corresponding to that of contact 11, the positive potential applied to the grid 15 becomes less and less and finally is unable to overcome the negative potential on grid 45, whereupon the tube 17 becomes non-conductive and the relay 27 is deenergized. Deenergization of the relay 27 causes the armatures 33 and 37 thereof to drop back, thereby deenergizing the motor 52 (and dynamically braking it by short circuiting the armature), and disconnecting the source of biasing potential 44 from the grids 45 and 46. The negative charge on the grids 45 and 46 leaks off through the grid resistor 47, and after an interval of time determined by the capacity of the condenser 48 and the resistance of resistor 47, the negative potential on the grid 45 drops to a value at which it is unable to overcome the effect of the small positive charge on the grid 15, whereupon the tube 17 again becomes conductive and again energizes the relay 27, to again apply the biasing potential from source 44 to the grids 45 and 46, and to energize the motor 52.

The first time the tube 17 is rendered non-conductive it remains in that condition only momentarily, because the positive charge on grid 15 is sufficient to again render the tube conductive as soon as the negative charge on grid 45 has dropped slightly. However, as the movable contact 14 approaches closer and closer to a position corresponding to that of the contact 11, and the positive potential on grid 15 becomes less and less, a greater reduction in negative potential of the grid 45 is required to make the tube 17 conductive. Therefore, the intervals during which the tube is conductive become progressively shorter and the intervals during which the tube is non-conductive become progressively longer as the movable contact 14 approaches its final position, thereby preventing any possibility of over-shooting.

If the primary control means or movable contact 11 is moved in the opposite direction, that is, to the left, grid 15 is rendered more negative and grid 16 is rendered more positive, causing tube 18 to become conductive instead of tube 17. This in turn energizes the relay 28 instead of the relay 27. The armature 34 and contact 36 of relay 28 connect the source of negative biasing potential 44 to grids 45 and 46 just the same as it was connected in response to energization of the relay 27. However, the closure of the armature 38 on contact 42 applies current to the motor 52 of opposite polarity to run the motor in the opposite direction and thereby move the contact 14 into position corresponding to the new position of the contact 11.

Control means of the type indicated at 10 and 13 in the drawing are not novel and are merely representative of known types of control involving automatic follow-up. Other known methods of applying primary and secondary control voltages to the grids 15 and 16 may be employed.

Various departures from the exact construction disclosed and described will be obvious to those skilled in the art, and the invention is to be limited only to the extent set forth in the appended claim.

I claim:

A system of the type described comprising: an electronic valve having an electron-emitting cathode and anode, and control electrode means for controlling the flow of electrons from said cathode to said anode; a source of anode potential connected between said cathode and anode; primary control means changing said control electrode means from a first normal condition in which it inhibits electron flow to said anode, to a second condition in which it enables a greater electron flow to said anode; movable controlled means; a relay energized by said greater electron flow to energize said control means to move toward a new position; follow-up means actuated by movement of said controlled means for returning said control electrode means to said first normal condition as said controlled means approaches said new position; means responsive to energization of said relay for biasing said control electrode means from said second toward said first condition; and means for maintaining said bias for a predetermined interval of time following de-energization of said relay, whereby said controlled means has time to decelerate following its de-energization before being re-energized by said primary control means.

HAROLD A. SILTAMAKI.

REFERENCES CITED

The following references are of record in the file of this patent:

UNITED STATES PATENTS

| Number | Name | Date |
| --- | --- | --- |
| 2,115,834 | Young | May 3, 1938 |
| 2,275,016 | Koch | Mar. 3, 1942 |
| 2,287,002 | Moseley | June 16, 1942 |
| 2,306,386 | Hollywood | Dec. 29, 1942 |
| 2,310,105 | Michel | Feb. 2, 1943 |
| 2,454,401 | Nygaard | Nov. 23, 1948 |
| 2,475,457 | Nygaard | July 5, 1949 |
| 2,475,461 | Roberts | July 5, 1949 |